United States Patent
Tsai

(10) Patent No.: US 9,917,464 B2
(45) Date of Patent: Mar. 13, 2018

(54) ELECTRONIC APPARATUS AND CHARGING/DISCHARGING MANAGEMENT METHOD THEREOF

(71) Applicant: GETAC TECHNOLOGY CORPORATION, Hsinchu County (TW)

(72) Inventor: Cheng-Han Tsai, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 95 days.

(21) Appl. No.: 15/076,547

(22) Filed: Mar. 21, 2016

(65) Prior Publication Data

US 2017/0098939 A1   Apr. 6, 2017

Related U.S. Application Data

(60) Provisional application No. 62/235,724, filed on Oct. 1, 2015.

(51) Int. Cl.
H02J 7/00   (2006.01)

(52) U.S. Cl.
CPC ............ *H02J 7/007* (2013.01); *H02J 7/0036* (2013.01); *H02J 7/0068* (2013.01); *H02J 2007/0095* (2013.01)

(58) Field of Classification Search
USPC ......................................... 320/132, 134, 136
See application file for complete search history.

(56) References Cited

U.S. PATENT DOCUMENTS

| 6,680,878 B1* | 1/2004 | Minabe et al. | G11B 15/023 348/E5.127 |
| 2013/0007473 A1* | 1/2013 | van der Lee | G06F 1/206 713/300 |
| 2016/0056657 A1* | 2/2016 | Hang | H02J 7/0068 320/128 |

* cited by examiner

*Primary Examiner* — Brian Ngo

(57) ABSTRACT

An electronic apparatus and a charging/discharging management method thereof are provided. The method entails disabling a charging/discharging path of a battery provided by the electronic apparatus and driving the electronic apparatus to enter a sleep mode according to a sleep mode control command, so as to ensure that the battery cannot supply power to the electronic apparatus through the charging/discharging path.

14 Claims, 3 Drawing Sheets

ELECTRONIC APPARATUS AND CHARGING/DISCHARGING MANAGEMENT METHOD THEREOF

BACKGROUND OF THE INVENTION

Field of the Invention

The present invention relates to electronic apparatuses and, more particularly, to a charging/discharging management method of an electronic apparatus.

Description of the Prior Art

Due to technological advances, most 3C products are mainly powered by batteries for the sake of mobility. Lithium batteries and lithium polymer batteries, which are common among all types of batteries, are advantageously capable of charging/discharging freely and thus widely applicable to plenty 3C products. However, lithium batteries and lithium polymer batteries end up with a shorter service life when overcharged or over-discharged. A conventional solution to the aforesaid problem requires mounting a smart surveillance device inside a packaging structure of a lithium battery to prevent the lithium battery from ending up with a shorter service life. Nonetheless, the conventional solution proves ineffective, as lithium batteries inevitably end up with a shorter service life after having been idle for 1~2 years. In view of this, old-generation 3C products are designed to have their batteries changed by users at will to extend the operation of 3C products. By contrast, in recent years, plenty 3C products are designed to have batteries packaged inside the 3C products to discourage users from changing the batteries for the sake of user safety. However, since the 3C products are designed to prevent users from changing batteries at will, the batteries end up with a shorter service life as a result of a low turnover of the 3C products after the delivery thereof, thereby leading to retailers' and consumers' frustration. In view of this, it is important to prevent batteries from ending up with a shorter service life while 3C products are for sale or being delivered.

SUMMARY OF THE INVENTION

The present invention provides a mobile power charging system capable of efficiently preventing batteries from ending up with a shorter service life.

The electronic apparatus of the present invention comprises a battery, a charging/discharging path switch unit and a control unit. The charging/discharging path switch unit is disposed on the charging/discharging path of the battery. The control unit is coupled to the charging/discharging path switch unit and adapted to drive the charging/discharging path switch unit to disable the charging/discharging path of the battery and enter a sleep mode according to a sleep mode control command. The sleep mode involves determining whether AC power previously coupled to the electronic apparatus has been coupled to the electronic apparatus again and enabling the charging/discharging path of the battery again when the determination is affirmative.

In an embodiment of the present invention, the electronic apparatus further comprises: a voltage transformation unit coupled between AC power and the control unit and adapted to transform the AC power into a charging current to be supplied to the battery through the charging/discharging path; and a micro-processing unit coupled to the voltage transformation unit and the control unit to receive a power voltage from the voltage transformation unit, send the sleep mode control command to the control unit, and send an enable signal to the control unit when the AC power is coupled to the voltage transformation unit again, thereby allow the control unit to drive the charging/discharging path switch unit to enable the charging/discharging path of the battery.

In an embodiment of the present invention, the battery supplies, through the charging/discharging path of the battery, power required for operation of the electronic apparatus, and the sleep mode control command is sent to the control unit as soon as the electronic apparatus is delivered.

In an embodiment of the present invention, in the sleep mode, the control unit determines whether it has received the enable signal to thereby determine whether the AC power has been coupled to the electronic apparatus again.

In an embodiment of the present invention, the charging/discharging path switch unit comprises a charging switch, a discharging switch, a first rectification unit and a second rectification unit. The discharging switch and the charging switch are series-connected between the battery and the voltage transformation unit. If the charging/discharging path of the battery is enabled, the control unit not only turns on the charging switch and turns off the discharging switch when charging is underway but also turns off the charging switch and turns on the discharging switch when discharging is underway. The first rectification unit is coupled to two ends of the discharging switch such that a current flows toward the battery unidirectionally. The second rectification unit is coupled to two ends of the charging switch such that a current flows toward the electronic apparatus unidirectionally.

In an embodiment of the present invention, both the charging switch and the discharging switch are P-type transistors, whereas both the first rectification unit and the second rectification unit are rectification diodes.

According to the present invention, a charging/discharging management method of an electronic apparatus, adapted to extend battery service life, comprises the steps of: receiving a sleep mode control command; disabling a charging/discharging path of a battery of the electronic apparatus and driving the electronic apparatus to enter a sleep mode according to the sleep mode control command; determining, in the sleep mode, whether AC power previously coupled to the electronic apparatus has been coupled to the electronic apparatus again; and enabling the charging/discharging path of the battery again when the determination is affirmative.

In an embodiment of the present invention, the battery supplies, through the charging/discharging path of the battery, power required for operation of the electronic apparatus, and the sleep mode control command is sent to the electronic apparatus as soon as the electronic apparatus is delivered.

In conclusion, the embodiment of the present invention entails disabling a charging/discharging path of a battery of the electronic apparatus and driving the electronic apparatus to enter a sleep mode according to the sleep mode control command to ensure that the battery cannot supply power to the electronic apparatus through the charging/discharging path, thereby efficiently preventing the voltage of the battery from dropping excessively as a result of a low turnover of the electronic apparatus after the delivery thereof and thus ending up with a shorter service life.

BRIEF DESCRIPTION OF THE DRAWINGS

To enable persons skilled in the art to fully understand the aforesaid features and advantages of the present invention, the present invention is hereunder illustrated with embodiments in conjunction with the accompanying drawings, in which.

DETAILED DESCRIPTION OF THE EMBODIMENTS

Figure 1:
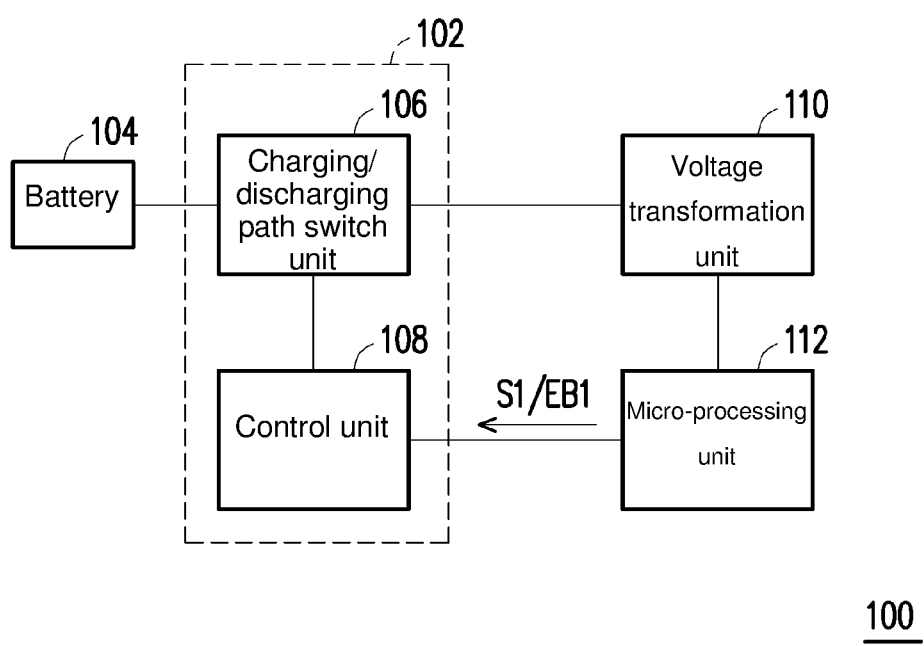
FIG. 1 is a schematic view of an electronic apparatus according to an embodiment of the present invention.

FIG. 1 is a schematic view of an electronic apparatus according to an embodiment of the present invention. Referring to FIG. 1, an electronic apparatus 100 comprises a battery management device 102, a battery 104, a voltage transformation unit 110 and a micro-processing unit 112. The electronic apparatus 100 is exemplified by an electronic product powered by a rechargeable battery, such as a cellular phone or a tablet, but the present invention is not limited thereto. The battery management device 102 manages the charging/discharging of the battery 104 such that not only does the battery 104 supply power to every circuit in the electronic apparatus 100, such as a memory circuit, a display circuit, or the like, but AC power is supplied to the battery 104 to charge the battery 104. The battery 104 is exemplified by a lithium battery or a lithium polymer battery. The battery management device 102 comprises a charging/discharging path switch unit 106 and a control unit 108. The charging/discharging path switch unit 106 is disposed on a charging/discharging path of the battery 104 and coupled to the control unit 108 and the voltage transformation unit 110. Both the control unit 108 and the voltage transformation unit 110 are coupled to the micro-processing unit 112. Both the charging/discharging path switch unit 106 and the control unit 108 are exemplified by control chips.

The control unit 108 controls the ON state of the charging/discharging path switch unit 106 to thereby enable or disable the charging/discharging path of the battery 104. If the electronic apparatus 100 is, in normal use, connected to AC power, the voltage transformation unit 110 will not only transform the AC power into a charging current for charging the battery 104 through the charging/discharging path of the battery 104 but also transform the AC power into power required for the operation of every circuit in the electronic apparatus 100 and supply the power to every circuit in the electronic apparatus 100. For example, the micro-processing unit 112 receives power voltage from the voltage transformation unit 110. If the electronic apparatus 100 is, in normal use, not connected to AC power, the battery 104 will supply power to every circuit in the electronic apparatus 100 through the charging/discharging path and the voltage transformation unit 110.

If the electronic apparatus 100 is ready for delivery, the electronic apparatus 100 will get connected to AC power, and the micro-processing unit 112 sends the control unit 108 a sleep mode control command S1 under which the control unit 108 drives the charging/discharging path switch unit 106 to disable the charging/discharging path of the battery 104 and enter a sleep mode. After the electronic apparatus 100 has been disconnected from the AC power and ready for delivery, the charging/discharging path of the battery 104 is disabled to therefore prevent power from being supplied to the control unit 108 through the charging/discharging path or supplied to any other circuit in the electronic apparatus 100 through the charging/discharging path; hence, after the delivery of the battery 104, the voltage of the battery 104 being transported and stored is unlikely to drop excessively because of the discharging of the battery 104, thereby efficiently preventing the battery 104 from ending up with a shorter service life.

Once a consumer connects the electronic apparatus 100 to AC power for the first time, that is, coupling AC power to the voltage transformation unit 110 for the first time after the delivery of the electronic apparatus 100, the voltage transformation unit 110 will transform the AC power and supply a power voltage to the micro-processing unit 112. After receiving the power voltage, the micro-processing unit 112 starts to operate and sends an enable signal EB1 to the control unit 108. In the sleep mode, the control unit 108 determines whether it has received the enable signal EB1 to thereby determine whether the electronic apparatus 100 has been connected to AC power again. The way of determining whether the control unit 108 has received the enable signal EB1 involves, for example, determining whether the control unit 108 has received the enable signal EB1 according to a change in the voltage level of a specific pin of the control unit 108 (for example, whether the specific pin of the control unit 108 has received an operating voltage (say 3.3V)) or according to whether the control unit 108 has received a clock signal. After the control unit 108 has received the enable signal EB1, the control unit 108 exits the sleep mode to therefore enable the charging/discharging path of the battery 104 again. At this point in time, the electronic apparatus 100 resumes normal operation, and thus the control unit 108 controls the charging/discharging path switch unit 106 according to the charging/discharging state of the battery 104, thereby allowing the battery 104 to discharge or to be charged.

Figure 2:
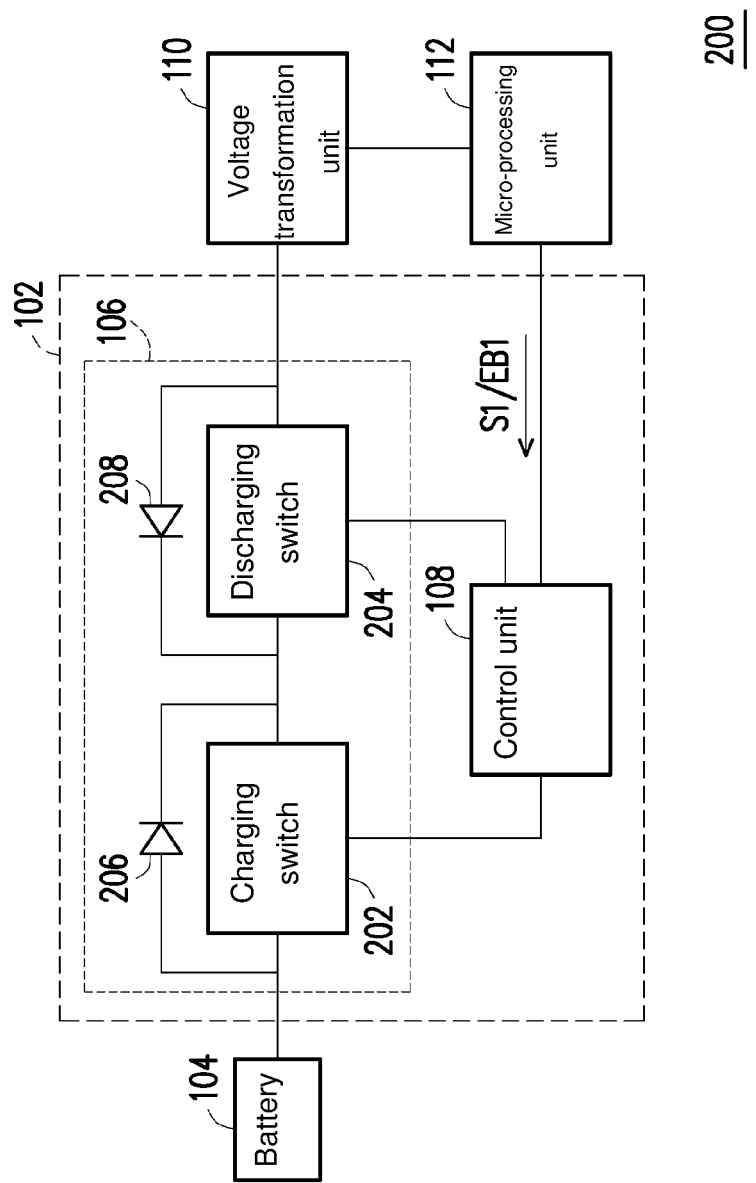
FIG. 2 is a schematic view of the electronic apparatus according to another embodiment of the present invention.

FIG. 2 is a schematic view of the electronic apparatus according to another embodiment of the present invention. Referring to FIG. 2, the charging/discharging path switch unit 106 is implemented in the same manner as the charging/discharging path switch unit 106 of the electronic apparatus 200 in this embodiment, and thus the charging/discharging path switch unit 106 comprises a charging switch 202, a discharging switch 204, a rectification unit 206 and a rectification unit 208. Both the discharging switch 204 and the charging switch 202 are series-connected between the battery 104 and the voltage transformation unit 110. The rectification unit 206 is coupled to the two ends of the charging switch 202 such that a current flows toward the electronic apparatus 100 unidirectionally whenever the battery 104 is discharging. The rectification unit 208 is coupled to the two ends of the discharging switch 204 such that a current flows toward the battery 104 unidirectionally whenever the battery 104 is being charged. Both the charging switch 202 and the discharging switch 204 are exemplified by P-type transistors. Both the rectification unit 206 and the rectification unit 208 are exemplified by rectification diodes, but the present invention is not limited thereto. In this embodiment, upon delivery of the electronic apparatus 100, the electronic apparatus 100 enters the sleep mode, and the charging/discharging path of the battery 104 is disabled. Referring to FIG. 2, the control unit 108 ensures controllably that both the charging switch 202 and the discharging switch 204 are turned off to prevent the battery 104 from having any charging/discharging path.

If the electronic apparatus 200 in normal use gets connected to AC power in an attempt to charge the battery 104, the microprocessing unit 112 will inform the control unit 108 that the voltage transformation unit 110 has got connected to the AC power; at this point in time, the control unit 108 turns on the charging switch 202 and turns off the discharging switch 204 to allow the voltage transformation unit 110 to transform the AC power into a charging current which flows toward the battery 104 through the rectification unit 208 and the charging switch 202, so as to charge the battery 104. If the electronic apparatus 200 is, in normal use, not connected to AC power and thus needs to access the power of the battery 104, the micro-processing unit 112 will inform the control unit 108 that the voltage transformation unit 110 has not got connected to the AC power; at this point in time, the control unit 108 turns on the discharging switch 204 and turns off the charging switch 202 to allow the battery 104 to supply power to circuits in the electronic apparatus 200 through the rectification unit 206 and the discharging switch 204.

Figure 3:
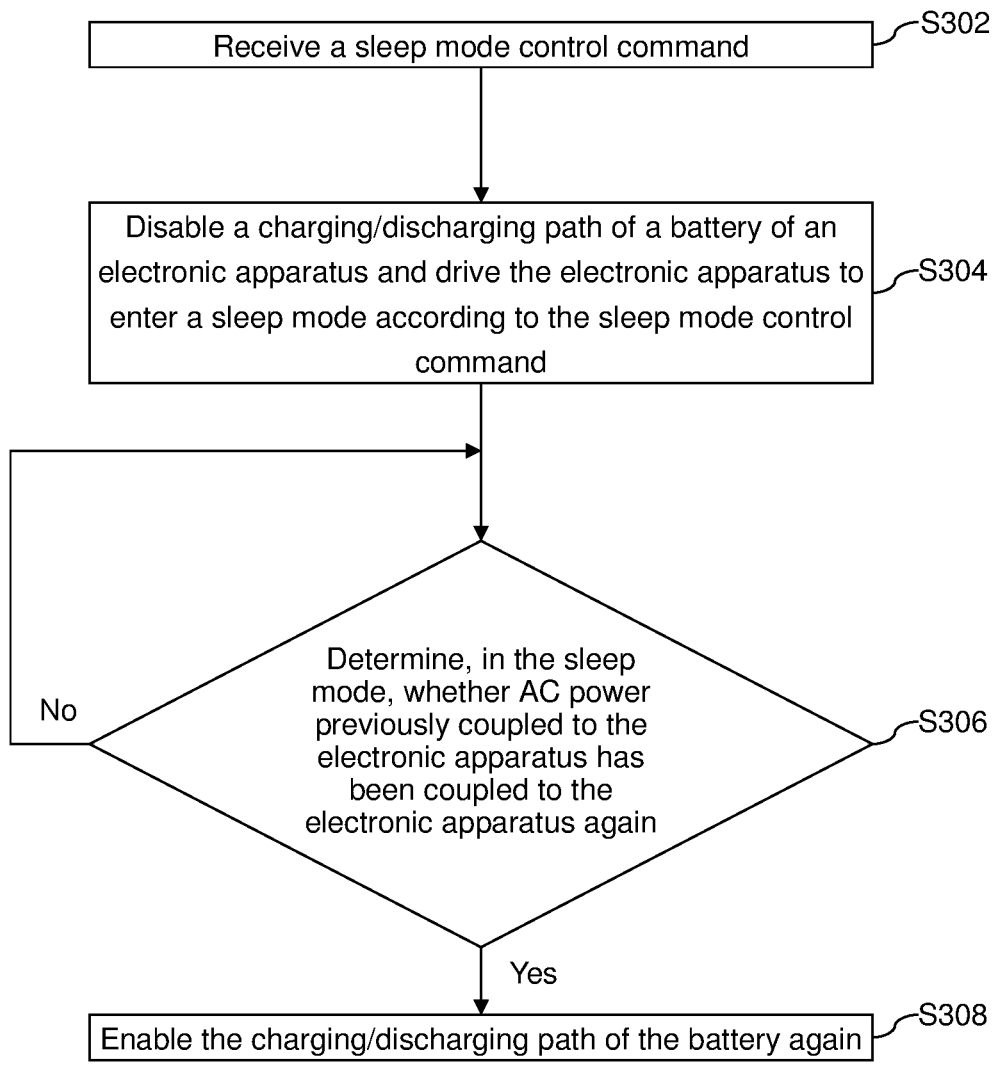
FIG. 3 is a flowchart of a charging/discharging management method of an electronic apparatus according to an embodiment of the present invention.

FIG. 3 is a flowchart of a charging/discharging management method of an electronic apparatus according to an embodiment of the present invention. Referring to FIG. 3, as shown in the aforesaid embodiment, the charging/discharging management method of an electronic apparatus comprises the steps described below. First, upon delivery of the electronic apparatus, the sleep mode control command is sent to the electronic apparatus such that the electronic apparatus receives the sleep mode control command (step S302) under which the charging/discharging path of the battery of the electronic apparatus is disabled, and the electronic apparatus enters the sleep mode (step S304). When the electronic apparatus is in normal use, the battery supplies power required for the operation of the electronic apparatus through the charging/discharging path of the battery. In step S304, after the electronic apparatus has been disconnected from the AC power and ready for delivery, the charging/discharging path of the battery is disabled to therefore prevent the battery from discharging through the charging/discharging path, and thus the voltage of the battery being transported and stored is unlikely to drop excessively because of the discharging of the battery, thereby efficiently preventing the battery from ending up with a shorter service life. In the sleep mode, the charging/discharging management method entails determining whether AC power previously coupled to the electronic apparatus has been coupled to the electronic apparatus again (step S306). In the first instance of use of the electronic apparatus after the delivery thereof, the electronic apparatus detects that the user enables the charging/discharging path of the battery again by connecting the electronic apparatus to AC power again (step S308), thereby allowing the electronic apparatus to resume normal operation. Conversely, if AC power is not coupled to the electronic apparatus again, the step S306 will continue, so as to determine whether AC power previously coupled to the electronic apparatus has been coupled to the electronic apparatus again.

In conclusion, the embodiment of the present invention entails disabling a charging/discharging path of a battery of the electronic apparatus and driving the electronic apparatus to enter a sleep mode according to the sleep mode control command to ensure that the battery cannot supply power to the electronic apparatus through the charging/discharging path, thereby efficiently preventing the voltage of the battery from dropping excessively as a result of a low turnover of the electronic apparatus after the delivery thereof and thus ending up with a shorter service life.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. An electronic apparatus, comprising:
   a battery;
   a charging/discharging path switch unit disposed on a charging/discharging path of the battery;
   a micro-processing unit; and
   a control unit coupled to the charging/discharging path switch unit and the micro-processing unit;
   wherein the micro-processing unit is adapted to send a sleep mode command to the control unit the first time the electronic apparatus is connected to an AC power source, and send an enable signal to the control unit the second time the electronic apparatus is connected to an AC power source; and
   wherein the control unit is adapted to drive the charging/discharging path switch unit to disable the charging/discharging path of the battery and enter a sleep mode according to when the sleep mode control command is received, and the control unit is adapted to enable the charging/discharging path and enter a normal mode when the enable signal is received.

2. The electronic apparatus of claim 1, further comprising:
   a voltage transformation unit adapted to be coupled with an AC power source, wherein the voltage transformation unit is coupled to the micro-processing unit and coupled between the AC power source and the control unit, and is adapted to transform the AC power into a charging current to be supplied to the battery through the charging/discharging path.

3. The electronic apparatus of claim 2, wherein the battery supplies power required for operation of the electronic apparatus through the charging/discharging path of the battery when the charging/discharging path is enabled.

4. The electronic apparatus of claim 2, wherein the charging/discharging path switch unit comprises:
   a charging switch;
   a discharging switch series-connected between the battery and the voltage transformation unit together with the charging switch, wherein, when the charging/discharging path of the battery is enabled, the control unit turns on the charging switch and turns off the discharging switch when charging is underway, and turns off the charging switch and turns on the discharging switch when discharging is underway;
   a first rectification unit coupled to two ends of the discharging switch such that current flows toward the battery unidirectionally; and
   a second rectification unit coupled to two ends of the charging switch such that current flows toward the electronic apparatus unidirectionally.

5. The electronic apparatus of claim 4, wherein the charging switch and the discharging switch are P-type transistors, and the first rectification unit and the second rectification unit are rectification diodes.

6. The electronic apparatus of claim 2, wherein the charging/discharging path switch unit comprises:
   a charging switch; and
   a discharging switch series-connected between the battery and the voltage transformation unit together with the charging switch, wherein, when the charging/discharging path of the battery is enabled, the control unit turns on the charging switch and turns off the discharging switch when charging is underway, and turns off the charging switch and turns on the discharging switch when discharging is underway.

7. The electronic apparatus of claim 1, wherein, when the electronic apparatus is not connected to an AC power source and in the normal mode, the charging/discharging path is enabled to allow the battery to power circuits of the electronic apparatus.

8. The electronic apparatus of claim 1, wherein, when the electronic apparatus is connected to an AC power source and in the normal mode, the charging/discharging path is enabled to allow the AC power source to power circuits of the electronic apparatus and to charge the battery.

9. A charging/discharging management method of an electronic apparatus comprising a battery, the method comprising the steps of:
  receiving, by a control unit, a sleep mode control command the first time the electronic apparatus is connected to an AC power source;
  disabling, by the control unit, a charging/discharging path of the battery of the electronic apparatus and driving the electronic apparatus to enter a sleep mode according to the sleep mode control command;
  determining, by the control unit while in the sleep mode, whether the electronic apparatus has been connected to an AC power source a second time; and
  enabling, by the control unit, the charging/discharging path of the battery and driving the electronic apparatus to enter a normal mode when the determination is affirmative.

10. The method of claim 9, wherein the battery supplies power required for operation of the electronic apparatus through the charging/discharging path of the battery when the charging/discharging path is enabled.

11. The method of claim 9, wherein the sleep mode control command is sent by a micro-processing unit when it detects the first time the electronic apparatus is connected to an AC power source.

12. The method of claim 11, wherein the an enable signal is sent by the micro-processing unit to the control unit the second time the electronic apparatus is connected to an AC power source, and the control unit determines that the electronic apparatus has been connected to an AC power source the second time when the enable signal is received.

13. The method of claim 9, wherein, when the electronic apparatus is not connected to an AC power source and in the normal mode, the charging/discharging path is enabled to allow the battery to power circuits of the electronic apparatus.

14. The method of claim 9, wherein, when the electronic apparatus is connected to an AC power source and in the normal mode, the charging/discharging path is enabled to allow the AC power source to power circuits of the electronic apparatus and to charge the battery.

* * * * *